G. H. SMITH.
Treatment of Bone, Vegetable Ivory, &c.

No. 217,418. Patented July 8, 1879.

3 Sheets—Sheet 2.

G. H. SMITH.
Treatment of Bone, Vegetable Ivory, &c.

No. 217,418. Patented July 8, 1879.

Witnesses:
E. A. Dick
C. J. Hedrick

George Hand Smith
by A. Pollok
his attorney.

G. H. SMITH.
Treatment of Bone, Vegetable Ivory, &c.

No. 217,418. Patented July 8, 1879.

Witnesses
E. A. Dick
C. J. Hedrick

George Hand Smith
by A. Pollok
his attorney

UNITED STATES PATENT OFFICE.

GEORGE HAND SMITH, OF SOUTH KENSINGTON, COUNTY OF MIDDLESEX, ENGLAND, ASSIGNOR TO SAMUEL B. SMITH, OF NEW YORK, N. Y.

IMPROVEMENT IN TREATMENT OF BONE, VEGETABLE IVORY, &c.

Specification forming part of Letters Patent No. 217,418, dated July 8, 1879; application filed April 26, 1879.

*To all whom it may concern:*

Be it known that I, GEORGE HAND SMITH, of South Kensington, in the county of Middlesex, England, doctor of medicine, have invented Improvements in the Treatment of Bone, Vegetable Ivory, and other porous substances, and in apparatus employed therein, of which the following is a specification.

My said invention has reference to the treatment of bone, vegetable ivory, and other porous substances, and relates chiefly to an improved process and apparatus whereby color, luster, and translucency, or some of these qualities, are imparted to certain of these substances and increased in others of a lustrous and translucent nature.

In carrying out my said process I find it advantageous to employ apparatus constructed in the manner shown on the accompanying drawings, or equivalent apparatus operating in a similar manner for a like purpose.

In my drawings I have shown two modifications of apparatus which will be practically successful, and the description of which will enable any further modifications to be made by persons skilled in treating substances analogous to those herein referred to, or in using apparatus of the character hereinafter described, in order to adapt the apparatus to the special requirements of particular cases.

Figure 1:
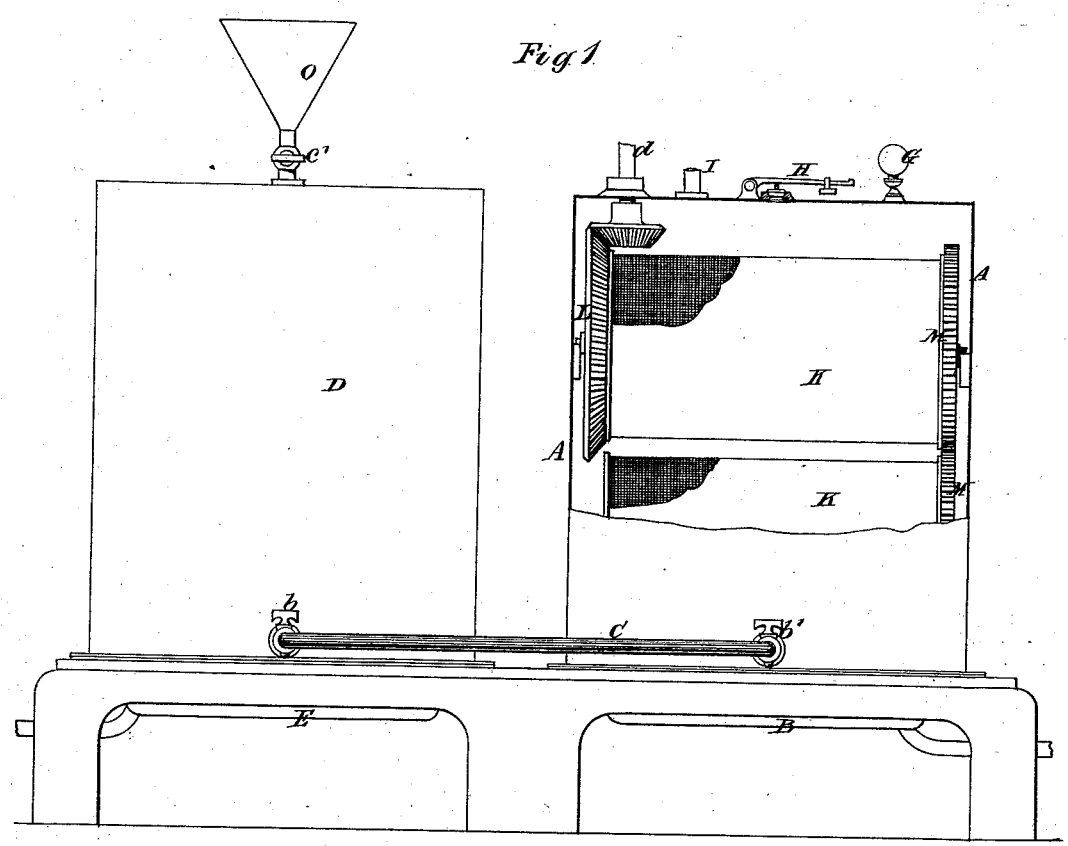
Figure 2:
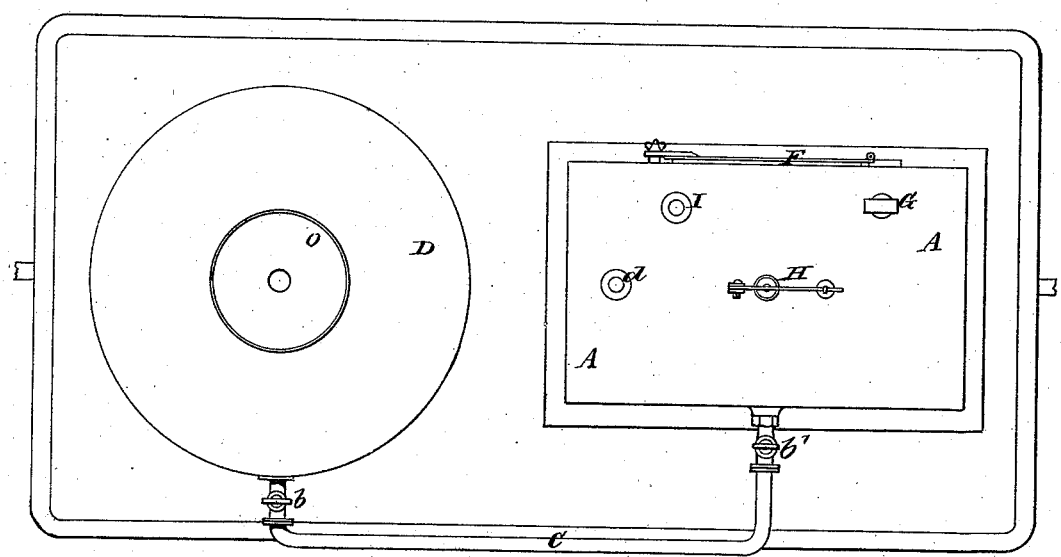
Figure 5:
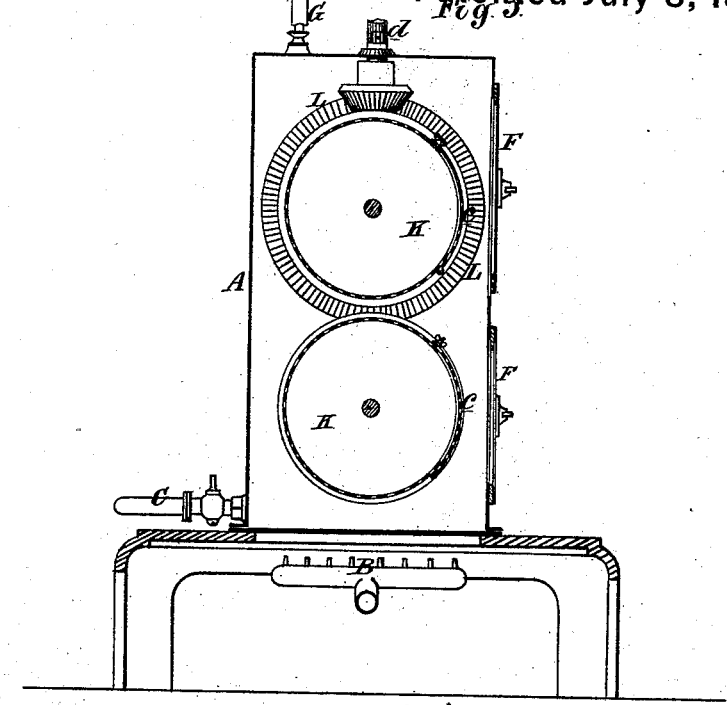
Figure 6:
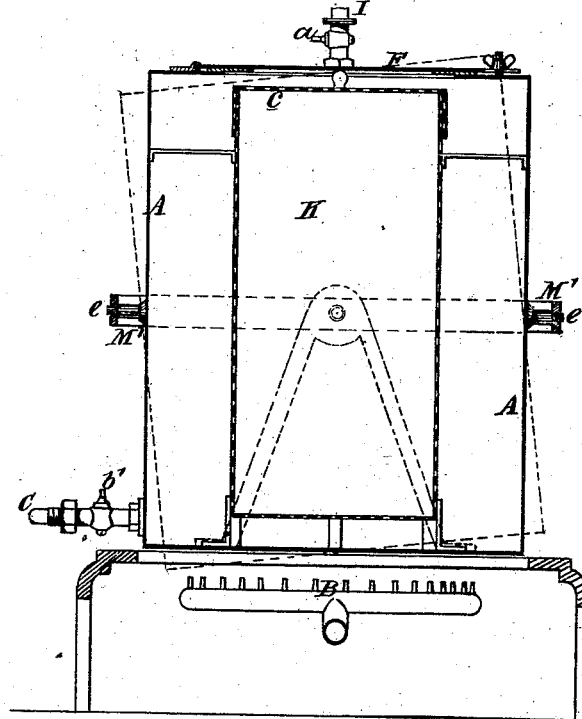
Figure 4:
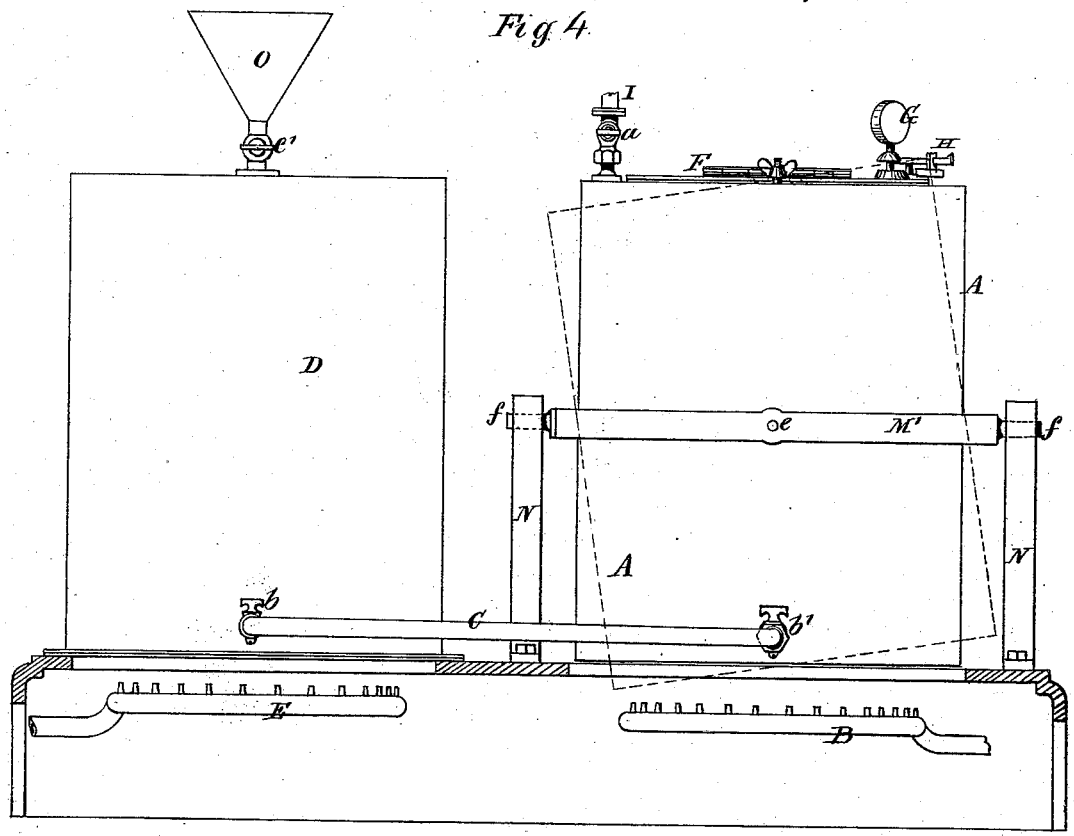
Figure 5:
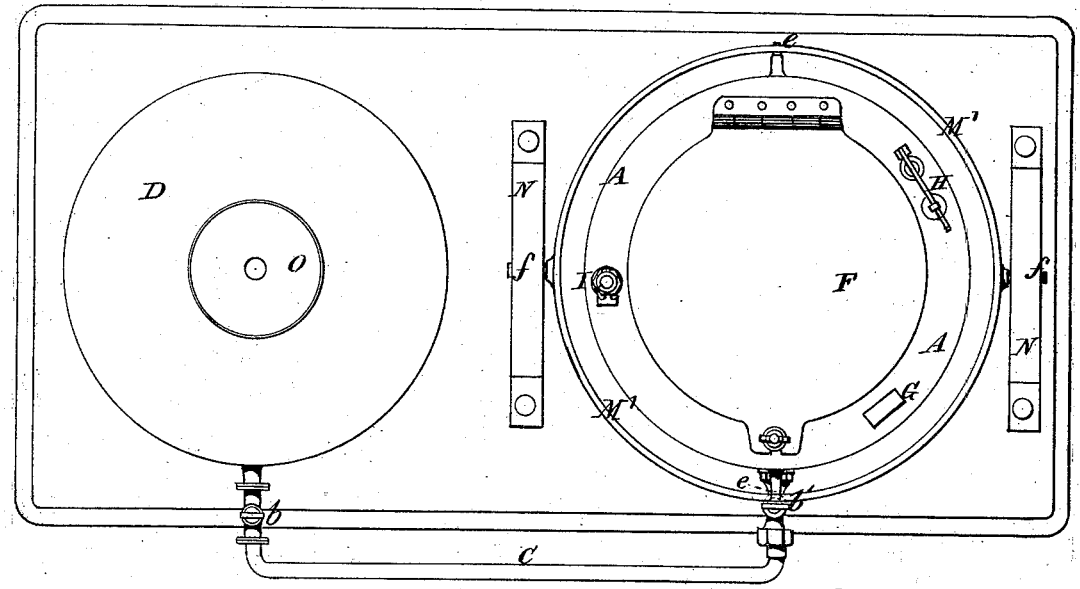

Figure 1 of my drawings represents a side elevation of an apparatus constructed according to one modification used by me for the purpose of carrying out my process. Fig. 2 is a corresponding plan, and Fig. 3 a transverse vertical section of the same, both corresponding to Fig. 1. Figs. 4, 5, and 6 are similar views to Figs. 1, 2, and 3, illustrating another modification.

The same letters indicate corresponding parts in all the figures.

A is a vessel or chamber, hereinafter designated the "holder," made of tinned iron, copper, or other suitable material, and of a convenient size and shape for the reception and treatment of the articles to be operated upon. The holder is so constructed as to be gas-tight and capable of being heated on its exterior by means of a gas-burner, B, or otherwise. It is connected by a pipe, C, with another vessel, D, hereinafter designated the "reservoir," whence the holder A is charged, as hereinafter explained, and the said reservoir is also capable of being heated either by means of a gas-burner, E, or in any other convenient manner. The holder A is provided with a man-hole, closed by a door or cover, F, and with a gage, G, for indicating pressure, and a safety-valve, H, or a cock for the relief of any excess of pressure, and also with a pipe, I, leading to or capable of being connected with a condenser. The pipe I is fitted with a cock, $a$, and similar cocks $b\ b'$ are provided in the pipe C, communicating between the holder A and the reservoir D.

In the interior of the holder A, I arrange one or more frames or cylinders, K, of wire-gauze or perforated metal, and which are intended to contain the articles to be operated upon, the said articles being introduced into the frame or frames through the man-hole at F and through a door or doors, $c$, with which the frames are provided. When necessary any convenient means of holding the articles may be employed, such as shelves, or, when required, separate holders or frames.

It is requisite, at a certain stage of the operation, that the articles under treatment should be so moved or tilted or inclined as to enable the mixtures hereinafter mentioned to be drained from them. Provision is made for enabling this to be effected either by mounting the frame or frames K in the holder A, so that they shall be free to rotate, as in the arrangement shown in Figs. 1, 2, and 3, or by making the holder itself movable on axes, as in the modification illustrated in Figs. 4, 5, and 6. In the former case, Figs. 1, 2, and 3, the frames are operated from the exterior, at $d$, by means of bevel-gearing L and spur-gearing H, while in the modification shown in Figs. 4, 5, and 6 the holder A is mounted on axes $e\ e$ in a gimbal, M', which in its turn is free to rotate on axes $f f$, carried in bearings in the framing N of the apparatus.

In carrying out my process with the aid of apparatus such, for example, as that shown in Figs. 1, 2, and 3, or in Figs. 4, 5, and 6, I proceed in the following manner, videlicet: The cocks $b b'$ in the connecting-pipe C being closed, I introduce into the reservoir D, through the funnel O, a mixture hereinafter termed the agent or converting agaiut of translucent or transparent materials, such as gum, gum-resins, caoutchouc, or any or more of these or similar materials combined with bisulphide of carbon or other like volatile solvents, such as ether, chloroform, or other matters possessing like desired properties. I then close the cock c, with which the said funnel is provided, and I place the articles to be operated upon in the frame or frames K of the holder A by introducing them through the man-hole at F and through the cover door or doors e, and then close the said doors and the man-hole door F. I then open the cocks b b', and, if necessary, apply heat to the under side of the reservoir D, so as to cause the agent to pass from the reservoir D into the holder A, whereby the articles contained in the frame or frames K of the holder will be submerged in the agent, and the cocks b b' are then closed. The bisulphide of carbon, or its equivalent, as before mentioned, penetrates the articles under treatment, and carries in with it the translucent or other material with which it is combined. This treatment may be carried out at the ordinary temperature, especially when bisulphide of carbon is used; or, when desired, it may be accelerated and facilitated by the application of heat, the vaporized bisulphide or its equivalent being confined so as to generate pressure and accelerate the action of the bisulphide or equivalent mixture. In some cases the agent may be first made thin to assist penetration, and afterward thickened by adding more gum, or its equivalent, so as to increase translucency and luster. When the articles have been subjected to the action of the agent for the requisite period, (which will vary according to the size of the articles under treatment and the mixtures used and the temperature applied,) a sufficient quantity of the agent to reduce the level of the liquid to below that of the articles operated upon is drawn off, either by gravitation or by means of a pump or of the pressure of the vapors evolved into the reservoir D, so that the said agent may be used again. After the articles have thus been fully charged with the agent and a portion of the latter has been drawn off from the holder A, as above mentioned, the articles are, if necessary, tilted or inclined, or are moved in any convenient manner to admit of the excess of the agent upon their surfaces being drained off, and to facilitate the action of the bisulphide of carbon, or its equivalent, the latter becomes vaporized from the residue of the agent remaining in the holder, and is thus made available for cleansing the surfaces of the said articles by dissolving the excess of the gum or its equivalent adhering to them, and enabling it to flow off.

The tilting or inclining or otherwise moving the position of the articles for this purpose is effected in the case of the arrangement of apparatus shown in Figs. 1, 2, and 3 by imparting rotary motion to the frames K in the manner hereinbefore described, and in the case of the modification illustrated by Figs. 4, 5, and 6 by turning the holder A itself upon its axis, having previously disconnected the pipe C at b'. In Fig. 4 I have represented, in dotted lines, the holder A as thus inclined, and in Fig. 6 I have represented, in dotted lines, the holder A in another inclined position, the object being to turn the articles into various successive positions, so as to facilitate the separation of the excess of the agent adhering to their surfaces and of the action thereon of the bisulphide of carbon or its equivalent employed.

If necessary, a gentle heat may be applied to the under side of the holder for the purpose of facilitating this stage of the process, provided that sufficient heat is not retained when heat is employed in the first stage, as above indicated. The remainder of the agent is then drawn off into the reservoir D.

In the case of the apparatus shown in Figs. 4, 5, and 6, the pipe C should be previously connected at b'. A gentle heat is continued to be applied to the holder A for a sufficient period, whereby the bisulphide of carbon, or its equivalent, remaining in the articles treated is driven off, through the pipe I, into a condenser or other convenient vessel for further use.

In some cases the articles, after having been treated with the converting agent and cleansed, may be removed and dried in a drying-chamber.

The employment of heat, which is advantageous in assisting the action of the converting agent and the cleansing of the articles, may in some cases be dispensed with. For instance, when bisulphide of carbon is the solvent used, the operations may be conducted at ordinary temperatures, and when heat is used to accelerate them only low heats should be used, as will be readily understood by those who are familiar with the character of this solvent.

In some cases fresh bisulphide of carbon, or its equivalent, may be introduced into the holder for the purpose of washing and cleansing the articles in the cleansing stage; or the cleansing may be effected by immersion in the bisulphide of carbon, or its equivalent, with the addition of a small quantity of gum, if necessary.

It will thus be understood that bisulphide of carbon will in all cases be found a very efficient agent for effecting or completing the cleansing operation.

After cleansing and drying slowly, so as not to disturb the materials taken up, ether or other solvent may be advantageously used to remove any film, if any be present. This may in some cases be effected by hand; or the articles may in some cases be finished by rubbing them with a revolving brush or buffer. In some cases it may be found advantageous— say, for example, when resin is employed as a constituent of the mixture used as the converting agent—to improve the finish of the articles after the treatment indicated. This may be done by immersion for a short period in a solution of caoutchouc in bisulphide of carbon or of gum-lac in alcohol, or in some other analogous solution or liquid.

If desirable, paraffine may be employed in place of bisulphide of carbon and gums in the first stage of the process, where the articles are impregnated with the converting agent. The articles after the superfluous paraffine has been removed or drained off are allowed to cool, and are then treated with solutions of gum-lac or caoutchouc or other like gums used to complete the process.

In order to effect this conveniently, additional reservoirs, containing different solutions of the gums or their equivalents employed, are provided, the same being so arranged as to be capable of being placed in communication with the holder by means of suitable pipes from the bottom of the respective vessels, fitted with cocks and union-joints, in order that they may be filled or emptied at will, and disconnected when motion is to be given to the holder, or any other convenient apparatus may be employed for effecting the desired object.

When articles have been treated in the manner hereinbefore described, on removing them from the holder they will be found, if originally opaque, to have become translucent, or to have acquired some other imparted quality, such as increased hardness or density, and if translucent, to have had their translucency increased with a higher luster and greater density.

The articles under treatment may be colored by the process described in the specification to Letters Patent granted to me, dated the 29th of September, 1877, No. 3,640, previously to their being subjected to the improved process which forms the subject of my present invention, or color may be added to the solution before mentioned or otherwise applied or supplied to the articles previously to or during their treatment by the present process.

When it is desired to impart color to articles intended to be treated by my improved process herein referred to, it will be found advantageous to apply the color to the articles beforehand, and to remove, by washing or otherwise, all excess of color from their surfaces before they are introduced into the holder and treated as above described. The solution employed will thereby be retained comparatively free from any imparted color.

Although I have described the above method of carrying my process into practical operation as being the most simple and effectual mode of proceeding with which I am acquainted, it will be obvious that it may in some respects be varied, and that the details of the operations and apparatus employed may be readily modified, as experience in conducting the operations may show to be necessary.

It will be seen that the employment of my improved process enables me to manufacture a material of a new character possessing properties of great commercial value.

Having now described and particularly ascertained the nature of my said invention and the manner in which the same is or may be used or carried into effect, I would observe in conclusion that what I consider to be novel and original, and therefore claim as the invention, is—

1. The herein-described process of treating bone, vegetable ivory, and other porous substances, the same consisting in subjecting the material to the action of a converting agent or agents, such as a solution of gum or gum-resins or equivalent, substantially as specified.

2. The process of treating bone, vegetable ivory, and other porous materials by subjecting the material to the action of a converting agent or agents of the character specified, and then removing the superfluous converting agents by vaporized solvents, substantially as described.

3. The process of treating bone and vegetable ivory and other porous material by coloring the material and subjecting it to the action of a solution of gum or other converting agent or agents, as specified, and removing the surplus agent, substantially as described.

4. An apparatus for treating bone, vegetable ivory, and other porous material, consisting of a holder, one or more perforated frames for containing the material under treatment, mechanism for moving or tilting said frames, one or more reservoirs and pipes for connecting said reservoirs, and the holder, substantially as described.

5. The new manufacture herein described, the same being a hard solid porous material, such as bone or vegetable ivory, having its pores filled with transparent or translucent material, such as gum or gum-resin, substantially as set forth.

In witness whereof I have signed my name to this specification in the presence of two subscribing witnesses.

GEORGE HAND SMITH.

Witnesses:
 CHAS. MILLS,
  47 *Lincoln's Inn Fields, London.*
 WM. GORTON,
  47 *Lincoln's Inn Fields, London.*